United States Patent
Amiry-Moghaddam et al.

(10) Patent No.: US 11,523,594 B2
(45) Date of Patent: Dec. 13, 2022

(54) AQUACULTURE SYSTEM

(71) Applicant: OXY SOLUTIONS AS, Oslo (NO)

(72) Inventors: Mahmood Amiry-Moghaddam, Jar (NO); Ingrid Moen, Oslo (NO); Hege Ugland, Stabekk (NO); Arild Hermansen, Oslo (NO); Camilla Haglerod, Vinterbro (NO)

(73) Assignee: OXY SOLUTIONS AS, Oslo (NO)

( * ) Notice: Subject to any disclaimer, the term of this patent is extended or adjusted under 35 U.S.C. 154(b) by 419 days.

(21) Appl. No.: 16/300,976

(22) PCT Filed: May 11, 2017

(86) PCT No.: PCT/GB2017/051314
§ 371 (c)(1),
(2) Date: Nov. 13, 2018

(87) PCT Pub. No.: WO2017/194949
PCT Pub. Date: Nov. 16, 2017

(65) Prior Publication Data
US 2020/0045943 A1   Feb. 13, 2020

(30) Foreign Application Priority Data
May 11, 2016   (GB) ....................................... 1608253

(51) Int. Cl.
*A01K 63/04*   (2006.01)
*A01K 63/06*   (2006.01)
(52) U.S. Cl.
CPC .......... *A01K 63/042* (2013.01); *A01K 63/065* (2013.01)
(58) Field of Classification Search
CPC .................................................. A01K 63/042
See application file for complete search history.

(56) References Cited

U.S. PATENT DOCUMENTS 3,904,393 A * 9/1975 Morse ................... B01F 5/0428
 210/167.23
4,271,099 A * 6/1981 Kukla .................. A01K 63/042
 261/76

(Continued)

FOREIGN PATENT DOCUMENTS

WO   2010077962 A1   7/2010

OTHER PUBLICATIONS

Author Unknown, "Fishfarming solutions for healthy fish," Equipment Portfolio, AGA Brochure, published as early as Nov. 7, 2018, 12 pages.

(Continued)

*Primary Examiner* — Christopher D Hutchens
(74) *Attorney, Agent, or Firm* — Withrow & Terranova, P.L.L.C.; Vincent K. Gustafson

(57) ABSTRACT

An aquaculture system (1) for farming aquatic organisms includes an apparatus (2) for supplying oxygenated water into an enclosure (20) in which aquatic organisms are to be fanned. The apparatus (2) includes a water inlet (4) and an oxygen inlet (6) to create a water and oxygen mixture. The apparatus (2) also includes a venturi (17) arranged to dissolve the oxygen into the water passing through the venturi and such that the oxygen and water mixture passing through the venturi (17) is exposed to a substantially null magnetic field. The apparatus is also arranged such that the water and oxygen mixture that is supplied to the venturi (17) contains substantially no colloidal minerals. The apparatus also includes an outlet (18) for the oxygenated water in fluid communication with, and downstream of, the venturi (17) and in fluid communication with the inlet of the enclosure (20).

15 Claims, 1 Drawing Sheet

(56) References Cited

U.S. PATENT DOCUMENTS

| | | | | |
|---|---|---|---|---|
| 4,478,765 | A * | 10/1984 | Tubbs | B01F 3/04099 138/44 |
| 4,639,340 | A | 1/1987 | Garrett | |
| 4,664,680 | A | 5/1987 | Weber | |
| 5,091,118 | A * | 2/1992 | Burgher | B01F 5/0451 261/123 |
| 6,120,008 | A * | 9/2000 | Littman | A61L 2/18 261/76 |
| 6,241,897 | B1 | 6/2001 | Hanson et al. | |
| 2002/0096792 | A1 * | 7/2002 | Valela | B01F 3/0446 261/4 |
| 2004/0004042 | A1 | 1/2004 | Hadley et al. | |
| 2010/0147690 | A1 | 6/2010 | Audunson et al. | |
| 2010/0154717 | A1 * | 6/2010 | Glomset | A01K 63/047 119/263 |
| 2012/0234254 | A1 * | 9/2012 | Audunson | C02F 9/00 119/231 |
| 2014/0120176 | A1 * | 5/2014 | Thorp | A61K 45/06 424/600 |
| 2014/0311417 | A1 * | 10/2014 | Stiles, Jr. | A01K 63/04 119/263 |
| 2017/0341038 | A1 | 11/2017 | Fox et al. | |
| 2018/0050312 | A1 * | 2/2018 | Cheng | B01F 3/04262 |

OTHER PUBLICATIONS

Author Unknown, "Hydrox DMT oksygeninnleser," for sentral driftsoksygenering og oksygenering på karnivå, Yara Praxair AS, published as early as Nov. 7, 2018, 15 pages.

Baylar, Ahmet, et al., "Numerical Modeling of Venturi Flows for Determining Air Injection Rates Using Fluent V6.2," Mathematical and Computational Applications, vol. 14, Issue 2, 2009, Association for Scientific Research, pp. 97-108.

Search Report under Section 17(5) for United Kingdom Patent Application No. GB1608253.9, dated Nov. 7, 2016, 3 pages.

International Search Report and Written Opinion for International Application No. PCT/GB2017/051314, dated Jul. 20, 2017, 14 pages.

Examination Report for European Patent Application No. 17724409. 2, dated Feb. 22, 2021, 6 pages.

* cited by examiner

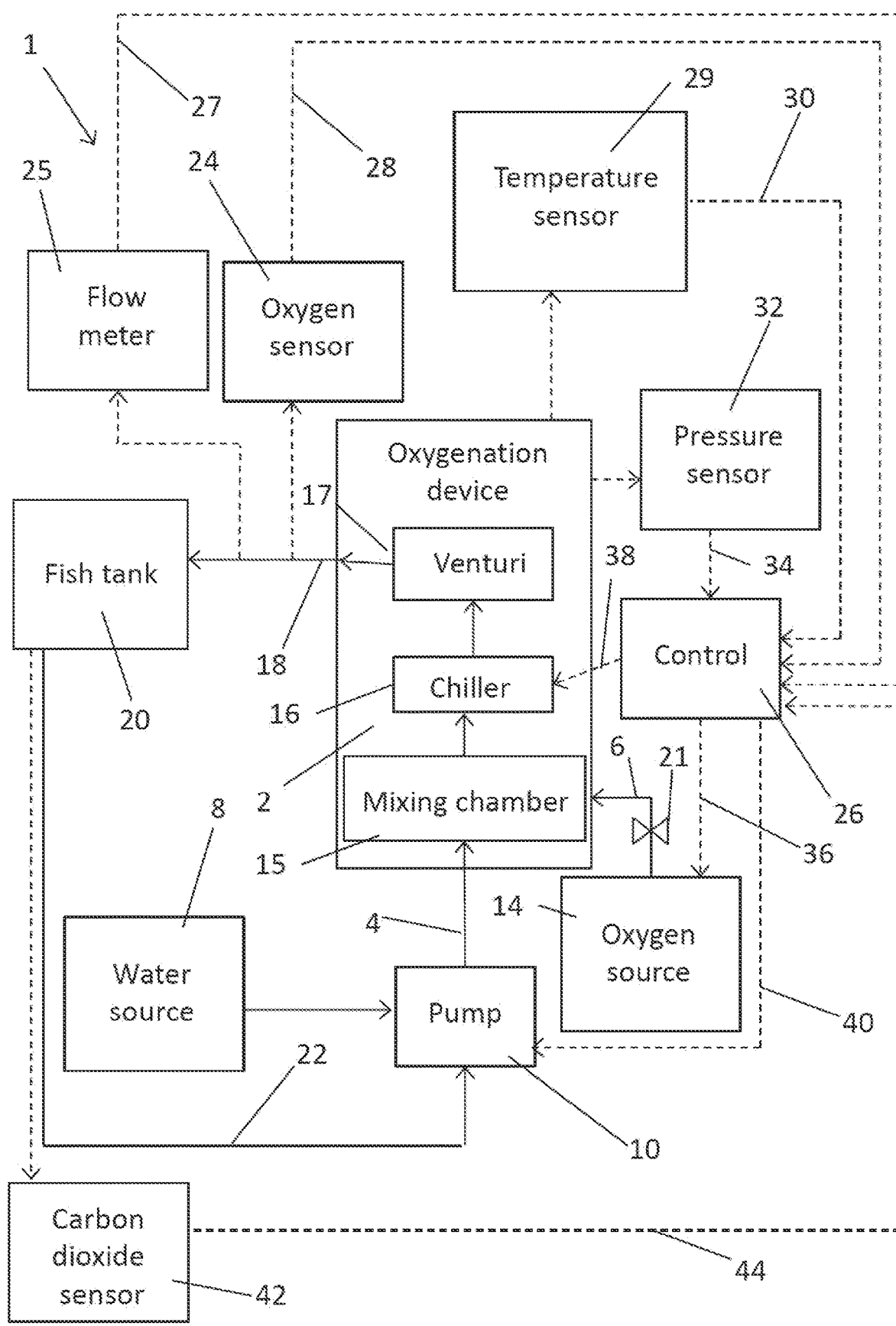

AQUACULTURE SYSTEM

This application is a 35 U.S.C. § 371 national phase filing of International Application No. PCT/GB2017/051314 filed on May 11, 2017, and claims the benefit of United Kingdom Patent Application No 1608253.9 filed on May 11, 2016, wherein the disclosures of the foregoing applications are hereby incorporated by reference herein in their respective entireties.

This invention relates to an aquaculture system for farming aquatic organisms, in particular to an aquatic system comprising an apparatus for supplying oxygenated water.

Commercial aquaculture, e.g. fish farming, is a major industry. Thus it is important to maximise the efficiency and quality of the production. For example, optimising the oxygen concentration of the water in which the fish are grown helps to improve the use of their feed, reduce their growth period, reduce their mortality and reduce their need for vaccination and antibiotics. It will thus be appreciated that controlling the oxygen concentration of the water may help to improve the reliability and profitability of such aquaculture operations.

The oxygen concentration of the water in which the fish are grown may be optimised by adding oxygen to the water. One technique for adding oxygen to water for such a use is that of gas sparging in which the oxygen is bubbled through the water such that some of the oxygen is dissolved into the water, from where it can be used by the fish being grown in the water.

However, there are a number of problems associated with gas sparging. One problem is that owing to oxygen's poor solubility in water, the amount of oxygen able to be dissolved in the water is lower than the ideally desired level of oxygen for the growth of fish, thus limiting the production of the fish being grown.

An alternative system for improving the oxygenation of a fluid (e.g. water) is disclosed in WO 2010/077962 A1 in which a liquid/ozone mixture has colloidal minerals and oxygen injected into it (the colloidal minerals to help with dissolving the oxygen into the liquid), with the mixture then being passed through a venturi having a magnetic field across it to dissolve the oxygen into the liquid. However, it will be appreciated that this is a rather complicated setup and that the use of colloidal minerals, e.g. microparticles, is not suitable for use in aquaculture systems as they may be ingested by the fish which provides a hazard both for the fish and the consumer of the fish.

The aim of the present invention is to provide an improved aquaculture system.

When viewed from a first aspect the invention provides an aquaculture system for farming aquatic organisms comprising:
an enclosure for oxygenated water in which aquatic organisms are to be farmed, wherein the enclosure comprises an inlet for feeding oxygenated water into the enclosure;
an apparatus for supplying oxygenated water into the enclosure, the apparatus comprising:
a water inlet for supplying water into the apparatus;
an oxygen inlet for supplying oxygen into the water within the apparatus to create a water and oxygen mixture, the oxygen inlet being in fluid communication with, and downstream of, the water inlet;
a venturi in fluid communication with, and downstream of, the water inlet and the oxygen inlet, wherein the venturi is arranged to dissolve the oxygen into the water passing through the venturi and such that the oxygen and water mixture passing through the venturi is exposed to a substantially null magnetic field, and wherein the apparatus is arranged such that the water and oxygen mixture that is supplied to the venturi contains substantially no colloidal minerals; and
an outlet for the oxygenated water in fluid communication with, and downstream of, the venturi;
wherein the outlet of the apparatus is in fluid communication with the inlet of the enclosure.

When viewed from a second aspect the invention provides a method of operating an aquaculture system for farming aquatic organisms that comprises:
an enclosure for oxygenated water in which aquatic organisms are to be farmed, wherein the enclosure comprises an inlet for feeding oxygenated water into the enclosure;
an apparatus for supplying oxygenated water into the enclosure, the apparatus comprising:
a water inlet;
an oxygen inlet, the oxygen inlet being in fluid communication with, and downstream of, the water inlet;
a venturi in fluid communication with, and downstream of, the water inlet and the oxygen inlet; and
an outlet for the oxygenated water in fluid communication with, and downstream of, the venturi;
wherein the outlet of the apparatus is in fluid communication with the inlet of the enclosure;
the method comprising:
supplying water to the water inlet of the apparatus;
supplying oxygen to the oxygen inlet of the apparatus so to supply oxygen into the water within the apparatus to produce a water and oxygen mixture, wherein the water and oxygen mixture contains substantially no colloidal minerals;
passing the water and oxygen mixture that contains substantially no colloidal minerals through the venturi so to dissolve the oxygen into the water to produce oxygenated water at the outlet of the apparatus, wherein the apparatus is operated such that the oxygen and water mixture passing through the venturi is exposed to a substantially null magnetic field; and
supplying the oxygenated water from the outlet of the apparatus to the inlet of the enclosure to provide the enclosure with oxygenated water for farming the aquatic organisms.

The present invention relates to an aquaculture system for farming aquatic organisms (e.g. fish, etc.) in oxygenated water and to a method of operating an aquaculture system. The system includes an enclosure for the oxygenated water and in which the aquatic organisms are to be farmed. The system also includes an apparatus for producing and supplying oxygenated water to the enclosure.

The apparatus is arranged to oxygenate water passing through the apparatus. The apparatus comprises water and oxygen inlets and an outlet, with a venturi therebetween. Water and oxygen are supplied into the apparatus via the respective inlets, the oxygen inlet being positioned downstream of the water inlet such that the oxygen is injected into the water flow. This water and oxygen mixture is then passed to a venturi, e.g. via a conduit in fluid communication with, and downstream of, the water inlet and the oxygen inlet, the conduit being arranged to supply the water and the oxygen to the venturi. Owing to the restriction the venturi creates in the flow path, this causes the water and oxygen mixture to accelerate through the venturi and then decelerate at the other side, generating a shockwave in the water and oxygen mixture which forces the oxygen to dissolve in the water, thus oxygenating the water.

The venturi is arranged to dissolve the oxygen into the water without the water and oxygen mixture being exposed to a magnetic field, and the oxygen and water mixture that passes through the venturi does not contain any colloidal minerals. The oxygenated water is then output from the apparatus through an outlet and to an inlet of the fish enclosure.

Owing to the oxygen having been dissolved into the water before it is supplied to the enclosure, a higher concentration of dissolved oxygen is achieved using the apparatus of the present invention compared with sparging. Furthermore, as the water is oxygenated without a magnetic field across the venturi and the water and oxygen mixture is free from colloidal minerals, the apparatus is thus simplified (e.g. compared to the arrangement in WO 2010/077962) and the lack of colloidal minerals makes the oxygenated water suitable for use in aquaculture.

It will also be appreciated that the system of the present invention may allow the concentration of dissolved oxygen in the water in the enclosure (in which the aquatic organisms are to be farmed) to be controlled, thus allowing a controlled aquaculture environment to be provided.

Furthermore, the Applicant has appreciated that the process of dissolving oxygen into the water in the apparatus may also help to strip the water passing through the apparatus of carbon dioxide. This again helps to provide a beneficial aquatic environment for the aquatic organisms to be farmed in, as too high levels of carbon dioxide in the water of the enclosure may be detrimental to the growth of aquatic organisms and may thus reduce the viability of such an operation.

The enclosure may be any suitable and desired type of enclosure for oxygenated water in which the aquatic organisms are to be farmed. In one embodiment the enclosure is configured for placement in a larger body of water, e.g. a lake, fjord, sea or ocean. Thus the enclosure may be configured such that it comprises an internal volume that is in fluid communication with the body of water in which it is placed, e.g. the enclosure may comprise a cage, net or other porous outer wall for containing the aquatic organisms.

In another embodiment the enclosure comprises an impermeable outer wall, i.e. to hold and contain the oxygenated water and the aquatic organisms. In this embodiment the enclosure may be configured for placement in a larger body of water (but with which it is not in fluid communication through its walls) or the enclosure may be configured for use remote from a body of water, e.g. on dry land (either inside a building or outside).

In a preferred embodiment the enclosure has a volume of between 250 and 1,000,000 litres, e.g. between 500 and 750,000 litres, e.g. between 5,000 and 100,000 litres, e.g. approximately 50,000 litres.

The water inlet may comprise any suitable and desired arrangement for supplying water into the apparatus. In a preferred embodiment the apparatus comprises a water source in fluid communication with the water inlet. The water source may comprise any suitable and desired source of water, e.g. depending on the type and location of the enclosure. For example, when the enclosure is configured for placement in a larger body of water, preferably the water source comprises the larger body of water. When the enclosure is configured for use remote from a body of water, preferably the water source comprises a mains water supply.

The water may be any suitable and desired type of water, e.g. depending on the water source and/or the type of aquatic organisms that are to be farmed. For example, the water may be fresh water (e.g. from a mains water supply or a body of fresh water (e.g. a fresh water lake)), the water may be salt water (e.g. from a body of salt water (e.g. a salt water lake, fjord, sea or ocean)) or the water may be brackish water (e.g. as a result of mixing salt water with fresh water).

The water may be flowed through the apparatus from the water inlet in any suitable and desired way. For example, the pressure of the incoming water owing to gravity, e.g. an elevated tank of water compared to the apparatus, could be employed to drive the water through the apparatus. This may be suitable when a lower pressure (and/or lower dissolved oxygen concentrations) in the apparatus is desired. However in a preferred embodiment the apparatus comprises a water inlet pump in fluid communication with and upstream of the water inlet, wherein the water inlet pump is arranged to pump the water through the apparatus. Preferably the water inlet pump is external to the other components of the apparatus (e.g. the venturi) and therefore can be provided as a separate, e.g., off-the-shelf, component.

The water inlet pump may comprise any suitable and desired type of pump, e.g. a magnetic drive pump (e.g. such as the PuraLev® series from Levitronix®), a positive displacement pump (e.g. a roller ball pump or a peristaltic pump). However in a preferred embodiment the water inlet pump comprises a gear pump, e.g. an external gear pump, such as the GJR series of Micropump®. The Applicants have found that a gear pump is able to deliver a smooth, e.g. laminar, flow of water to the water inlet, which helps to maximise the oxygenation of the water.

The oxygen inlet may comprise any suitable and desired arrangement for supplying oxygen into the water within the apparatus to create a water and oxygen mixture. In a preferred embodiment the apparatus comprises an oxygen source in fluid communication with the oxygen inlet. The oxygen source may comprise any suitable and desired source of oxygen. The oxygen may be supplied into the apparatus in a liquid and/or a gaseous form. In one embodiment the apparatus comprises a pressurised oxygen supply, e.g. a pressurised gas canister containing oxygen, in fluid communication with the oxygen inlet.

The venturi, for dissolving the oxygen (in the oxygen and water mixture) into the water passing through the venturi, may comprise any suitable and desired type of venturi. The apparatus may comprise only a single venturi. However in one set of embodiments the apparatus comprises a plurality of venturis in fluid communication with, and downstream of, the water inlet and the oxygen inlet, wherein the venturis are arranged to dissolve the oxygen into the water passing through the venturis. Providing multiple venturis increases the flow rate capacity of the device and may increase the amount of oxygen which is dissolved in the water and thus the concentration of dissolved oxygen in the water output from the apparatus.

The plurality of venturis may be arranged in series and/or in parallel with each other. In the embodiment in which the venturis are arranged in parallel with each other the apparatus may comprise one or more valves, each valve in fluid communication with, and upstream or downstream of, a respective venturi. Thus each valve is arranged to open or close to allow the water and the oxygen to flow through its respective venturi. Thus, by controlling the number of valves that are open or closed, the flow rate of the water through the apparatus can be controlled.

The one or more venturis may take any suitable and desired form, e.g. dependent on the size of the device (e.g. dependent on the size of the enclosure and/or the number of venturis in the device) and the desired degree of oxygenation. In one embodiment the length of the venturi, i.e. the length of the restriction in the flow path, is preferably between 50 mm and 1,330 mm, e.g. between 100 mm and 800 mm, e.g. between 200 mm and 400 mm, e.g. approximately 300 mm. The cross section of the venturi, i.e. in a plane perpendicular to the direction of the flow path through the venturi, has a shape which may comprise a circle, an oval, a rectangle, or any other suitable and desired shape. The depth of the venturi, i.e. minimum dimension in a direction substantially perpendicular to the direction of the flow path through the venturi, is preferably between 0.05 mm and 45 mm, e.g. between 1 mm and 30 mm, e.g. between 4 mm and 20 mm, e.g. approximately 10 mm. The width of the venturi, i.e. the maximum dimension in a direction substantially perpendicular to the direction of the flow path through the venturi, and generally substantially perpendicular to the depth of the venturi, is preferably between 10 mm and 700 mm, e.g. between 40 mm and 300 mm, e.g. approximately 80 mm.

The configuration of the one or more venturis may also be defined by their relative dimensions. Thus, in one embodiment the ratio of the depth of the venturi to the width of the venturi is between 0.001 and 0.03, e.g. approximately 0.01. In one embodiment the ratio of the length of the venturi to the width of the venturi is between 2 and 8, e.g. approximately 4.

At least part of the venturi may be formed in an integrally formed piece of material with at least part of the water inlet, at least part of the oxygen inlet and at least part of the outlet. Integrally forming these components in this way allows a compact apparatus to be provided that does not contain multiple individually manufactured components, e.g. which need to be connected together with tubes. However in a preferred embodiment the venturi, the water inlet, of the oxygen inlet and the outlet are provided as separate components, e.g. that are placed in fluid communication with each other, e.g. by means of suitable conduits. Arranging the components in this way may help to give the apparatus a greater flow capacity.

In one embodiment the apparatus comprises a diffusion chamber in fluid communication with, and downstream of, the oxygen inlet (and also the water inlet), the diffusion chamber and the oxygen inlet being arranged such that the oxygen is supplied through the oxygen inlet into the diffusion chamber. The diffusion chamber provides a volume through which the water flows and into which the oxygen is injected, with the diffusion chamber being arranged to promote the break-up of bubbles of oxygen into smaller bubbles, e.g. by encouraging turbulent flow of the water and the oxygen in the diffusion chamber. Preferably a grid or mesh, e.g. made from glass, metal or plastic, is arranged in the diffusion chamber, e.g. through which the oxygen and water must pass into the diffusion chamber. This helps to break-up the oxygen into small bubbles within the water so that they are more easily dissolved into the water in the diffusion chamber and downstream in the apparatus, e.g. in the venturi.

In one embodiment the apparatus comprises a mixing chamber in fluid communication with, and downstream of, the oxygen inlet and the water inlet (and also the diffusion chamber in the embodiment in which it is provided), the mixing chamber being arranged to induce turbulence into the water flowing therethrough. The mixing chamber produces turbulent flow of the water and the oxygen flowing through the mixing chamber which acts to break-up the oxygen into small bubbles within the water, e.g. smaller than they were broken up into in the diffusion chamber, so that they are more easily dissolved into the water in the mixing chamber and downstream in the apparatus, e.g. in the venturi. The mixing chamber may be provided in any suitable and desired way, i.e. to induce the necessary turbulent flow. Preferably the mixing chamber comprises one or more obstacles and/or a tortuous path. The obstacles may comprise one or more barriers in the flow path through the mixing chamber, around which the fluid flowing therethrough must pass.

The venturi may be arranged in any suitable and desired way such that the oxygen and water mixture passing through the venturi is exposed to a substantially null magnetic field (other than, e.g., the earth's magnetic field). For example, the apparatus may comprise shielding surrounding the venturi to protect the water and oxygen mixture that passes through the venturi from any external magnetic fields, or the venturi itself may provide such shielding itself. However in a preferred embodiment the apparatus is arranged such that substantially no magnetic field is generated at the location of the venturi, e.g. within the apparatus as a whole.

The apparatus may be arranged in any suitable and desired way such that the water and oxygen mixture that is supplied to the venturi contains substantially no colloidal minerals. For example, the apparatus may comprise a filter to remove colloidal minerals from the water and/or the water and oxygen mixture before the water and oxygen mixture reaches the venturi (i.e. upstream of the venturi). However in a preferred embodiment the apparatus comprises no source of colloidal minerals. Thus preferably the oxygenated water that is supplied to the enclosure contains substantially no colloidal minerals.

The apparatus may comprise a filter to remove additives or other unwanted substances from the water (e.g. in addition to or the same filter as that for removing colloidal minerals), either upstream of the water inlet or downstream of the outlet, i.e. before or after oxygenation of the water, or even within the main body of the apparatus, i.e. the integrally formed piece of material. For example, in one embodiment the apparatus comprises, e.g. additional, means to remove carbon dioxide from the water, e.g. a carbon dioxide scrubber, a carbon dioxide stripper, etc. As for the filter, the carbon dioxide removal means can be positioned in any suitable and desired place within the apparatus, e.g. upstream of the water inlet, downstream of the outlet or within the main body of the apparatus. Removal of carbon dioxide from the water may be desired, for example, because carbon dioxide is produced by the aquatic organisms in the enclosure and needs to be removed before the water is recycled, for example, back to the enclosure via the apparatus for (re-)oxygenation.

In another embodiment the apparatus comprises an additive inlet, either upstream of the water inlet or downstream of the outlet, arranged to supply one or more additives into the water. For example nutrients or other food may be added to the water before supplying the oxygenated water to the enclosure, so that the fish being farmed in the enclosure are suitably nourished. Alternatively, or in addition, to having an additive inlet, the water supplied to the apparatus may already contain the desired additives, e.g. added during the preparation of the water.

In one embodiment the apparatus is arranged such that the water and oxygen mixture that is supplied to the venturi contains substantially no ozone. In a preferred embodiment the apparatus comprises no source of ozone. Thus preferably the oxygenated water that is supplied to the enclosure contains substantially no ozone.

In one embodiment the apparatus comprises a gas/liquid separator downstream of and in fluid communication with the outlet, wherein the gas/liquid separator is arranged to separate undissolved oxygen from the oxygenated water. This allows bubbles of oxygen to be removed from the oxygenated water, e.g. in circumstances when they are not desired or where large amounts of undissolved oxygen is present.

In the embodiments comprising a gas/liquid separator, preferably the apparatus also comprises an oxygen recycling conduit for recycling undissolved oxygen back to the oxygen inlet. This helps to minimise the waste of undissolved oxygen and thus reduces the cost of the oxygen used in the process.

The apparatus may be arranged to produce oxygenated water (for supplying to the enclosure) with any suitable and desired concentration of dissolved oxygen. This may depend on the arrangement of the apparatus in the system. For example, as discussed below, the system may be configured to recycle, e.g. continuously circulate, the water from the enclosure through the apparatus for (re-)oxygenation. In this embodiment the dissolved oxygen concentration of the oxygenated water output from the apparatus is preferably at approximately the desired dissolved oxygen concentration for farming the aquatic organisms in the enclosure.

Alternatively the system may be configured to operate in a batch feed method of operation, where the oxygenated water is mixed with the water in the enclosure, such that the dissolved oxygen concentration of the water in the enclosure (once the oxygenated water has been added) is at the desired dissolved oxygen concentration for farming the aquatic organisms in the enclosure. In this embodiment the dissolved oxygen concentration of the oxygenated water output from the apparatus is preferably output having a significantly higher (e.g. between 5 and 20 times higher) dissolved oxygen concentration than that desired for farming the aquatic organisms in the enclosure.

In a preferred embodiment (e.g. when the system is configured to operate in a batch feed mode of operation) the apparatus is arranged to produce oxygenated water with a concentration of dissolved oxygen of between 62 mg/l and 125 mg/l, e.g. between 80 mg/l and 100 mg/l, e.g. approximately 90 mg/l. In another preferred embodiment (e.g. when the system is configured to operate in a continuously circulating mode of operation) the apparatus is arranged to produce oxygenated water with a concentration of dissolved oxygen of between 2 mg/l and 40 mg/l, e.g. between 4 mg/l and 20 mg/l, e.g. approximately 5 mg/l.

However, it will be appreciated that the concentration of dissolved oxygen in the water in the enclosure and/or in the oxygenated water output from the apparatus is preferably controlled depending on the type of aquatic organisms being cultured. Thus, as will be described below, preferably the concentration of dissolved oxygen in the oxygenated water output from the apparatus is controlled.

The apparatus may be used at any temperature as is desired and is suitable, e.g. the ambient temperature of the water being supplied into the apparatus. Preferably the temperature of the water in the enclosure and/or output from the apparatus depends on the type of aquatic organism being farmed, which may be different for different types of aquatic organisms. In a preferred embodiment the (e.g. water inlet is arranged such that the) temperature of the water supplied into the apparatus is between 1 and 20 degrees centigrade, e.g. between 3 and 15 degrees centigrade, e.g. between 5 and 10 degrees centigrade. In a preferred embodiment the (e.g. apparatus is arranged such that the) temperature of the oxygenated water supplied into the enclosure (and/or of the temperature of the water in the enclosure) is between 2 and 20 degrees centigrade (e.g. suitable for farming tuna, the optimum temperature for which is 19.5 degrees centigrade for yellow fin tuna and between 18 and 19 degrees centigrade for southern blue fin tuna), e.g. between 4 and 18 degrees centigrade (e.g. suitable for farming salmon), e.g. between 6 and 7 degrees centigrade.

Although the temperature of the input and output water may simply be the ambient temperature of the water being supplied into the apparatus and the enclosure respectively, in some embodiments the apparatus may comprise a heater and/or a chiller to heat and/or cool the water that is supplied into the apparatus and the enclosure as appropriate to achieve the desired temperature.

After passing through the apparatus and being oxygenated, some of the oxygenated water may be recycled, e.g. the apparatus may comprise a conduit arranged to recycle a portion of the oxygenated water from the outlet to the water inlet, with the outlet being arranged to supply a remaining portion of the oxygenated fluid that is not recycled to the enclosure. Thus in one embodiment the conduit has one end in fluid communication with, and downstream of, the outlet, and another end in fluid communication with and upstream of the water inlet. Recycling some of the oxygenated water may help to increase the concentration of dissolved oxygen in the water owing to at least some of the water passing multiple times through the apparatus before being output.

However in a preferred embodiment the apparatus is arranged to operate in a single pass production mode, i.e. with no recycling of the oxygenated water. In this embodiment the apparatus takes the water from the water inlet, passes it through the apparatus where it is oxygenated, and outputs it from the apparatus through the outlet to the enclosure, such that the apparatus can simply be connected in between a water supply and the enclosure to which the oxygenated water is supplied. This helps to simplify the apparatus and its connections. In this embodiment, however, the oxygenated water may be recycled back to the apparatus after passing through the enclosure. Thus the apparatus may comprise a conduit arranged to recycle the oxygenated water from the enclosure to the water inlet of the apparatus.

The flow rate of the water through the apparatus may be any suitable and desired value or range of values, e.g. depending on the volume of the enclosure. In one embodiment the apparatus is arranged to deliver a flow rate of oxygenated water of between 50 l/min (litres per minute) and 1200 l/min from the outlet of the apparatus, e.g. between 100 l/min and 800 l/min, e.g. between 400 l/min and 600 l/min, e.g. approximately 500 l/min. Therefore preferably the water inlet pump is arranged to deliver a flow rate of between 50 l/min and 1200 l/min, e.g. between 100 l/min and 800 l/min, e.g. between 400 l/min and 600 l/min, e.g. approximately 500 l/min.

The pressure of the water flowing through the apparatus may be any suitable and desired value or range of values. In one embodiment the apparatus is arranged to operate at a fluid pressure of between 140 kPa and 340 kPa, e.g. between 200 and 300 kPa, e.g. approximately 290 kPa. Thus preferably the water inlet pump is arranged to deliver a pressure of between 140 kPa and 340 kPa, e.g. between 200 and 300 kPa, e.g. approximately 290 kPa.

In one embodiment the system (e.g. the apparatus) comprises a pressure sensor arranged to measure the pressure of the water in the apparatus, and/or an oxygen sensor arranged to measure the concentration of dissolved oxygen in the water, and/or a flow rate sensor, e.g. a flow meter, arranged to measure the flow rate of the water through the apparatus, and/or a temperature sensor arranged to measure the temperature of the water in the apparatus.

Preferably the system, e.g. the enclosure or the recycling conduit, comprises a carbon dioxide sensor arranged to measure the concentration of carbon dioxide in the water, e.g. in the enclosure. Owing to the respiration of the aquatic organisms in the enclosure, dissolved oxygen in the water of the enclosure will be consumed by the aquatic organisms and carbon dioxide will be produced by the aquatic organisms. Measuring the concentration of carbon dioxide thus gives an indication of the amount of oxygen consumed from the oxygenated water and therefore the need for more oxygenated water to be supplied to the enclosure.

The various sensors may be positioned to measure their respective variables at any suitable point in the system. For example, the pressure sensor is preferably positioned between the water inlet and the venturi, e.g. downstream of the mixing chamber in the embodiments in which this is provided. Preferably the oxygen sensor is positioned downstream of the venturi, e.g. at the water outlet or in the enclosure. Preferably the temperature sensor is positioned downstream of the heater or the chiller, in the embodiments that comprise a heater or a chiller.

Providing one or more, preferably all, of these sensors allows the respective variables to be measured. This enables feedback to be performed in order to optimise the performance of the apparatus and/or provide quality control. Thus preferably, in the embodiments in which they are provided, the temperature sensor is arranged to provide feedback to the heater or to the chiller (e.g. such that the heater or the chiller can be operated, based on the feedback, to control the temperature of the water in the apparatus, e.g. to maintain it at a particular temperature), and/or the flow rate sensor is arranged to provide feedback to the water inlet pump (e.g. such that the pump can be operated, based on the feedback, to control the flow rate of the water through the apparatus, e.g. to maintain it at a particular flow rate), and/or the oxygen sensor (and/or the carbon dioxide sensor) is arranged to provide feedback to one or more of: the oxygen supply, the water inlet pump and the heater or the chiller (e.g. such that one or more of the oxygen supply, the water inlet pump and the heater or the chiller can be operated, based on the feedback, to control their operation, e.g. to maintain the oxygen concentration of the water output from the apparatus (and/or in the enclosure) at a particular oxygen concentration).

Preferably the system (e.g. the apparatus) comprises a control arranged to receive the measurements output from one or more (and preferably all) of the sensors and to send control signals to the respective components with which the sensors are arranged to provide feedback to. Thus, for example, the measurements from the flow rate sensor are received by the control which then sends an appropriate control signal to the water inlet pump, e.g. by changing the input voltage to the pump, or to the plurality of valves, e.g. such that the flow rate of the water through the apparatus can be controlled, e.g. to maintain it at a particular flow rate. This feedback and control provides regulation of the various different variables within the apparatus and system.

While the apparatus has been described thus far as part of a system, the Applicants believe that the apparatus is novel and inventive in its own right. Therefore when viewed from a third aspect the invention provides an apparatus for supplying oxygenated water in an aquaculture system for farming aquatic organisms comprising:

a water inlet for supplying water into the apparatus;

an oxygen inlet for supplying oxygen into the water within the apparatus to create a water and oxygen mixture, the oxygen inlet being in fluid communication with, and downstream of, the water inlet;

a venturi in fluid communication with, and downstream of, the water inlet and the oxygen inlet, wherein the venturi is arranged to dissolve the oxygen into the water passing through the venturi and such that the oxygen and water mixture passing through the venturi is exposed to a substantially null magnetic field, and wherein the apparatus is arranged such that the water and oxygen mixture that is supplied to the venturi contains substantially no colloidal minerals; and an outlet for the oxygenated water in fluid communication with, and downstream of, the venturi, for supplying the oxygenated water for use in an aquaculture system.

When viewed from a fourth aspect the invention provides a method of operating an apparatus to provide oxygenated water to an aquaculture system for farming aquatic organisms, the apparatus comprising:

a water inlet;

an oxygen inlet, the oxygen inlet being in fluid communication with, and downstream of, the water inlet;

a venturi in fluid communication with, and downstream of, the water inlet and the oxygen inlet; and an outlet for the oxygenated water in fluid communication with, and downstream of, the venturi;

the method comprising:

supplying water to the water inlet of the apparatus;

supplying oxygen to the oxygen inlet of the apparatus so to supply oxygen into the water within the apparatus to produce a water and oxygen mixture, wherein the water and oxygen mixture contains substantially no colloidal minerals;

passing the water and oxygen mixture that contains substantially no colloidal minerals through the venturi so to dissolve the oxygen into the water to produce oxygenated water at the outlet of the apparatus, wherein the apparatus is operated such that the oxygen and water mixture passing through the venturi is exposed to a substantially null magnetic field; and supplying the oxygenated water from the outlet of the apparatus to provide oxygenated water for farming aquatic organisms in an aquaculture system.

As will be appreciated by those skilled in the art, these aspects of the invention can, and preferably do, include any one or more or all of the preferred and optional features of the present invention discussed herein, as appropriate.

An embodiment of the invention will now be described, by way of example only, with reference to the accompanying drawing, in which:

FIG. 1 shows a schematic diagram of a system including an apparatus according to an embodiment of the present invention which includes an oxygenation device.

FIG. 1 shows a schematic diagram of an aquaculture system 1 according to an embodiment of the present invention. Solid lines indicate the flow of fluids, i.e. water or oxygen, through appropriate conduits, and dashed lines indicate the transfer of information, e.g. control signals. The aquaculture system 1 includes an oxygenation device 2 that has a water inlet 4 and an oxygen inlet 6. Water is pumped into the water inlet 4 from a water source 8, e.g. a mains water supply, by a pump 10, e.g. a gear pump. Oxygen is supplied into the oxygen inlet 6 from an oxygen source 14, e.g. a pressurised gas canister of oxygen.

The oxygenation device 2 includes a mixing chamber 15 arranged in fluid communication with, and downstream of, the water inlet 4 and the oxygen inlet 6, the mixing chamber 15 comprising one or more obstacles and/or a tortuous path to induce turbulence into the water flowing therethrough and break-up the oxygen into a plurality of oxygen bubbles.

The outlet 18 supplies the oxygenated water to a fish tank 20. Oxygenated water which has been used by the fish tank 20 is returned to the oxygenation device 2 via a recycling conduit 22 and the pump 10.

An oxygen sensor 24 is arranged to measure the concentration of dissolved oxygen in the oxygenated water output from the oxygenation device 2 through the outlet 18. The dissolved oxygen concentration measurements are sent to a control 26 via a wire 28. A flow meter 25 is arranged to measure the flow rate of the oxygenated water output from the oxygenation device 2 through the outlet 18. The flow rate measurements are sent to the control 26 via a wire 27. A temperature sensor 29 is arranged to measure the temperature of the water flowing through the oxygenation device 2, downstream of the chiller 16. The temperature measurements are sent to the control 26 via a wire 30. A pressure sensor 32 is arranged to measure the pressure of the water flowing through the oxygenation device 2. The pressure measurements are sent to the control 26 via a wire 34. A carbon dioxide sensor 42 is arranged to measure the concentration of carbon dioxide in the water in the fish tank 20. The carbon dioxide concentration measurements are sent to the control 26 via a wire 44.

The control is connected to the oxygen source 14, the chiller 16 and the pump 10 by respective wires 36, 38, 40 and is arranged to communicate with these components using control signals sent along the wires 36, 38, 40.

Operation of the system will now be described with reference to FIG. 1.

In order to supply oxygenated water to the fish tank 20, the pump 10 is operated to pump water from the water source 8 into the oxygenation device 2 through the water inlet 4, and a valve 21 on the pressurised gas canister of the oxygen source 14 is opened to supply oxygen to the oxygen inlet 6. The chiller 16 is also energised to cool the water supplied to the oxygenation device 2 via the water inlet 4 to a temperature of approximately 8 degrees centigrade before it reaches the venturi 17.

The temperature of the water flowing through the oxygenation device 2 is measured by the temperature sensor 29, with the temperature measurements being sent via the wire 30 to the control 26. Based on the temperature measurements, the control 26 provides feedback control signals via the wire 38 to the chiller 16 to control the power of the chiller 16 so that the temperature of the water is kept constant at approximately 8 degrees centigrade.

The pressure of the water in the oxygenation device 2 is measured by the pressure sensor 32. The pressure measurements are then sent from the pressure sensor 32 to the control 26 via the wire 34. Based on the pressure measurements, the control 26 then provides feedback control signals via the wire 40 to the pump 10 to control the power of pump 10, i.e. pressure it delivers, so that the pressure can be kept at an appropriate level, e.g. 290 kPa, for the oxygenation of the water and for supplying the oxygenated water at the desired flow rate to the fish tank 20.

The water enters the oxygenation device 2 via the water inlet 4 and then oxygen is injected into the water via the oxygen inlet 6. The resultant water and oxygen mixture then passes through the venturi 17. The restriction the venturi 17 creates in the conduit causes the water and oxygen mixture to accelerate and then decelerate, creating a shockwave in the water and oxygen mixture which forces the oxygen to dissolve in the water, thus oxygenating the water. It will be noted that the oxygen is dissolved into the water without the use of colloidal minerals or a magnetic field.

The oxygenated water is output from the oxygenation device 2 through the outlet 18 and supplied to the fish tank 20. As the oxygenated water passes from the outlet 18 to the fish tank 20, the oxygen sensor 24 measures the concentration of dissolved oxygen in the oxygenated water and the flow meter 25 measures the flow rate of the oxygenated water being output from the oxygenation device 2. The carbon dioxide sensor 42 also measures the concentration of carbon dioxide in the water in the fish tank, e.g. as a result of the fish respiring. The dissolved oxygen concentration, the carbon dioxide concentration and flow rate measurements are sent from the oxygen sensor 24, the carbon dioxide sensor 42 and the flow meter 25 to the control 26 via the respective wires 28, 44, 27.

Based on the dissolved oxygen concentration, the carbon dioxide concentration and flow rate measurements the control 26 then sends control signals via the wires 36, 40 to the oxygen source 14 and/or the pump 10 respectively so that the amount of oxygen supplied into the oxygenation device 2 and/or the flow rate of the water through the oxygenation device 2 can be varied in order to optimise the dissolved oxygen concentration in the water output from the oxygenation device 2 and in the fish tank 20.

The oxygenated water is flowed through the fish tank 20 where it is used for the farming of fish that are contained in the fish tank 20. After passing through the fish tank 20 the water is returned to the oxygenation device 2 via a recycling conduit 22 and the pump 10 where it can be oxygenated again and recycled back to the fish tank 20.

It can be seen from the above that in at least preferred embodiments of the invention, an apparatus is provided that oxygenates water passing through the apparatus for use in an aquaculture system. The use of a venturi in the apparatus to dissolve the oxygen into the water before it is supplied to the aquaculture system provides oxygenated water with a higher concentration of dissolved oxygen than is achieved using conventional sparging. Furthermore, as the water is oxygenated without a magnetic field across the venturi and the water and oxygen mixture is free from colloidal minerals, the apparatus is thus simplified and the lack of colloidal minerals makes the oxygenated water suitable for use in aquaculture.

The invention claimed is:

1. An aquaculture system for farming aquatic organisms, the aquaculture system comprising:
  an enclosure for oxygenated water in which aquatic organisms are to be farmed, wherein the enclosure comprises an inlet for feeding oxygenated water into the enclosure;
  an apparatus for supplying oxygenated water into the enclosure, the apparatus comprising:
    a water inlet for supplying water into the apparatus;
    an oxygen inlet for supplying oxygen into the water within the apparatus to create a water and oxygen mixture, the oxygen inlet being in fluid communication with, and downstream of, the water inlet;
    a diffusion chamber;
      wherein the diffusion chamber is in fluid communication with, and downstream of, the water inlet;

wherein the diffusion chamber is in fluid communication with, and downstream of, the oxygen inlet;
wherein the diffusion chamber is arranged such that the oxygen is supplied through the oxygen inlet into the diffusion chamber to create the water and oxygen mixture;
a mixing chamber;
wherein the mixing chamber is in fluid communication with, and downstream of, the diffusion chamber;
wherein the mixing chamber is arranged to receive the water and oxygen mixture from the diffusion chamber; and
wherein the mixing chamber comprises one or more obstacles and/or a tortuous path to induce turbulence into the water and oxygen mixture flowing therethrough and break-up the oxygen into a plurality of oxygen bubbles;
wherein the aquaculture system further comprises:
a venturi;
wherein the venturi is in fluid communication with, and downstream of, the mixing chamber;
wherein the venturi is arranged to dissolve the oxygen into the water when the water and oxygen mixture passes through the venturi and such that the oxygen and water mixture passing through the venturi is exposed to a substantially null magnetic field; and
wherein the apparatus is arranged such that the water and oxygen mixture that is supplied to the venturi contains substantially no colloidal minerals;
wherein the aquaculture system further comprises:
an outlet for the oxygenated water in fluid communication with, and downstream of, the venturi;
wherein the outlet of the apparatus is in fluid communication with the inlet of the enclosure; and
wherein the apparatus is arranged to produce oxygenated water with a concentration of dissolved oxygen of between 62 mg/l and 125 mg/l.

2. The aquaculture system as claimed in claim 1, wherein the apparatus comprises a water source in fluid communication with the water inlet.

3. The aquaculture system as claimed in claim 1, wherein the apparatus comprises a water inlet pump in fluid communication with and upstream of the water inlet, wherein the water inlet pump is arranged to pump the water through the apparatus.

4. The aquaculture system as claimed in claim 1, wherein the apparatus comprises an oxygen source in fluid communication with the oxygen inlet.

5. The aquaculture system as claimed in claim 1, wherein the venturi, the water inlet, the oxygen inlet, and the outlet are provided as separate components.

6. The aquaculture system as claimed in claim 1, wherein the apparatus is devoid of an ozone source.

7. The aquaculture system as claimed in claim 1, wherein the temperature of the water supplied into the apparatus is between 1 and 20 degrees centigrade.

8. The aquaculture system as claimed in claim 1, wherein the apparatus comprises a conduit arranged to recycle the oxygenated water from the enclosure to the water inlet of the apparatus.

9. The aquaculture system as claimed in claim 1, wherein the apparatus is arranged to deliver a flow rate of oxygenated water of between 50 l/min and 1200 l/min from the outlet of the apparatus.

10. The aquaculture system as claimed in claim 1, wherein the apparatus is arranged to operate at a fluid pressure of between 140 kPa and 340 kPa.

11. The aquaculture system as claimed in claim 1, comprising a pressure sensor arranged to measure the pressure of the water in the apparatus, and/or an oxygen sensor arranged to measure the concentration of dissolved oxygen in the water, and/or a flow rate sensor arranged to measure the flow rate of the water through the apparatus, and/or a temperature sensor arranged to measure the temperature of the water in the apparatus, and/or a carbon dioxide sensor arranged to measure the concentration of carbon dioxide in the water.

12. The aquaculture system as claimed in claim 11, comprising a control arranged to receive one or more of the pressure measurement output from the pressure sensor, the dissolved oxygen concentration output from the oxygen sensor, the flow rate measurement output from the flow rate sensor, the carbon dioxide concentration output from the carbon dioxide sensor and/or the temperature measurement output from the temperature sensor, and to send feedback control signals to one or more of: the oxygen supply, the pump and a chiller or a heater.

13. An apparatus for supplying oxygenated water in an aquaculture system for farming aquatic organisms, the apparatus comprising:
a water inlet for supplying water into the apparatus;
an oxygen inlet for supplying oxygen into the water within the apparatus to create a water and oxygen mixture, the oxygen inlet being in fluid communication with, and downstream of, the water inlet;
a diffusion chamber;
wherein the diffusion chamber is in fluid communication with, and downstream of, the water inlet;
wherein the diffusion chamber is in fluid communication with, and downstream of, the oxygen inlet;
wherein the diffusion chamber is arranged such that the oxygen is supplied through the oxygen inlet into the diffusion chamber to create the water and oxygen mixture;
a mixing chamber;
wherein the mixing chamber is in fluid communication with, and downstream of, the diffusion chamber;
wherein the mixing chamber is arranged to receive the water and oxygen mixture from the diffusion chamber; and
wherein the mixing chamber comprises one or more obstacles and/or a tortuous path to induce turbulence into the water and oxygen mixture flowing therethrough and break-up the oxygen into a plurality of oxygen bubbles;
wherein the apparatus further comprises:
a venturi;
wherein the venturi is in fluid communication with, and downstream of, the mixing chamber;
wherein the venturi is arranged to dissolve the oxygen into the water when the water and oxygen mixture passes through the venturi and such that the oxygen and water mixture passing through the venturi is exposed to a substantially null magnetic field; and
wherein the apparatus is arranged such that the water and oxygen mixture that is supplied to the venturi contains substantially no colloidal minerals;

wherein the apparatus further comprises:
an outlet for the oxygenated water in fluid communication with, and downstream of, the venturi, for supplying the oxygenated water for use in an aquaculture system; and
wherein the apparatus is arranged to produce oxygenated water with a concentration of dissolved oxygen of between 62 mg/l and 125 mg/l.

14. An aquaculture system for farming aquatic organisms comprising:
an enclosure for oxygenated water in which aquatic organisms are to be farmed, wherein the enclosure comprises an inlet for feeding oxygenated water into the enclosure;
an apparatus for supplying oxygenated water into the enclosure, the apparatus comprising:
a water inlet for supplying water into the apparatus;
an oxygen inlet for supplying oxygen into the water within the apparatus to create a water and oxygen mixture, the oxygen inlet being in fluid communication with, and downstream of, the water inlet;
a mixing chamber;
wherein the mixing chamber is in fluid communication with, and downstream of, the water inlet and the oxygen inlet;
wherein the mixing chamber is arranged to receive the water and oxygen mixture from the water inlet and the oxygen inlet; and
wherein the mixing chamber comprises one or more obstacles and/or a tortuous path to induce turbulence into the water and oxygen mixture flowing therethrough and break-up the oxygen into a plurality of oxygen bubbles;
wherein the aquaculture system further comprises:
a venturi;
wherein the venturi is in fluid communication with, and downstream of, the mixing chamber;
wherein the venturi is arranged to dissolve the oxygen into the water when the water and oxygen mixture passes through the venturi and such that the oxygen and water mixture passing through the venturi is exposed to a substantially null magnetic field; and
wherein the apparatus is arranged such that the water and oxygen mixture that is supplied to the venturi contains substantially no colloidal minerals;
wherein the aquaculture system further comprises:
an outlet for the oxygenated water in fluid communication with, and downstream of, the venturi;
wherein the outlet of the apparatus is in fluid communication with the inlet of the enclosure;
wherein the apparatus is arranged to produce oxygenated water with a concentration of dissolved oxygen of between 62 mg/l and 125 mg/l; and
wherein at least part of the water inlet, at least part of the oxygen inlet, at least part of the venturi, and at least part of the outlet are integrally formed as a unitary piece of material.

15. An apparatus for supplying oxygenated water in an aquaculture system for farming aquatic organisms comprising:
a water inlet for supplying water into the apparatus;
an oxygen inlet for supplying oxygen into the water within the apparatus to create a water and oxygen mixture, the oxygen inlet being in fluid communication with, and downstream of, the water inlet;
a mixing chamber;
wherein the mixing chamber is in fluid communication with, and downstream of, the water inlet and the oxygen inlet;
wherein the mixing chamber is arranged to receive the water and oxygen mixture from the water inlet and the oxygen inlet; and
wherein the mixing chamber comprises one or more obstacles and/or a tortuous path to induce turbulence into the water and oxygen mixture flowing therethrough and break-up the oxygen into a plurality of oxygen bubbles;
wherein the apparatus further comprises:
a venturi;
wherein the venturi is in fluid communication with, and downstream of, the mixing chamber;
wherein the venturi is arranged to dissolve the oxygen into the water when the water and oxygen mixture passes through the venturi and such that the oxygen and water mixture passing through the venturi is exposed to a substantially null magnetic field; and
wherein the apparatus is arranged such that the water and oxygen mixture that is supplied to the venturi contains substantially no colloidal minerals;
wherein the apparatus further comprises:
an outlet for the oxygenated water in fluid communication with, and downstream of, the venturi, for supplying the oxygenated water for use in an aquaculture system;
wherein the apparatus is arranged to produce oxygenated water with a concentration of dissolved oxygen of between 62 mg/l and 125 mg/l; and
wherein at least part of the water inlet, at least part of the oxygen inlet, at least part of the venturi, and at least part of the outlet are integrally formed as a unitary piece of material.

* * * * *